Feb. 10, 1942. W. C. BURTON ET AL 2,272,904

PARKING METER

Filed Dec. 13, 1937 4 Sheets-Sheet 3

INVENTORS.
WILLIAM C. BURTON,
HERBERT J. BRANDENBURGER,
BY
ATTORNEY.

Feb. 10, 1942. W. C. BURTON ET AL 2,272,904
PARKING METER
Filed Dec. 13, 1937 4 Sheets-Sheet 4

INVENTORS:
WILLIAM C. BURTON,
HERBERT J. BRANDENBURGER
BY E M Harrington
ATTORNEY.

Patented Feb. 10, 1942

2,272,904

UNITED STATES PATENT OFFICE 2,272,904

PARKING METER

William C. Burton, Webster Groves, and Herbert J. Brandenburger, St. Louis, Mo., assignors of one-sixth to L. Ray Schuessler and one-sixth to Gustave V. Keller, both of St. Louis, Mo.

Application December 13, 1937, Serial No. 179,382

5 Claims. (Cl. 194—78)

This invention relates generally to parking meters of the type employed in cities and towns for the purpose of regulating the parking of motor vehicles and other conveyances on the streets of said cities and towns, and more specifically to an improved parking meter which because of its unique construction and mode of use is capable of extremely efficient and effective operation, the predominant object of the invention being to provide an improved parking meter which is so constructed and is so employed that a parker who sets the meter in operation when he parks his vehicle at the meter and leaves the parking space after he has overstayed his allotted time or without depositing the required coin in the meter to pay for the time his vehicle occupied the parking space, may be identified after his departure by proper police authorities.

As is quite generally known, many cities and towns have in the past few years installed parking meters in positions adjacent to streets of said cities and towns to regulate parking of vehicles in said streets. Ordinarily these parking meters are coin-operated and when a proper coin is deposited in one of the meters its mechanism is set in motion and runs for a predetermined period of time, one hour, for instance. When, in the use of these earlier parking meters, a person in authority found a vehicle parked adjacent to a parking meter which indicated that the purchased parking period had expired the person in authority would wait until the parker reappeared and then follow the procedure which the law provided in such cases. The deficiency of these earlier parking meters was that their use required that police officers or other persons in authority keep watch on the meters as otherwise a parker who overstayed his time might drive away from the meter and the authorities would have no way of identifying the offender.

The predominant feature of the present invention is that any person who parks his vehicle at and uses one of the improved meters is positively identified so that if such a person overstays the permitted parking period, or fails to drop the proper coin in the meter in payment for the parking privilege, he may be readily identified and summoned before the proper authority. In order to identify all persons who use the improved parking meters each driver of a motor vehicle may apply for and receive from the city or town government a key which will operate all of the improved parking meters installed in the city or town. Each of such keys bears an identifying mark, the holder's automobile license number, for instance, and record is kept of the name and address of the holder of each identified key.

When a person who holds an identified key wishes to park at one of the improved meters he inserts his identified key in the proper key hole in the casing of the meter and turns the key to set the mechanism of the meter in motion. By turning the key as described the parker also locks the key in the key hole so that it may be removed by him only by inserting a proper coin in the coin slot of the meter. However to release the key by inserting a coin in the meter such coin must be inserted during the time period the parker's vehicle is privileged to occupy the parking space at the meter, and if a coin is inserted in the meter after the allowed period has expired the key is not released. Thus, if a parker overstays his allotted time and drives away he leaves behind him locked in the key hole of the meter a key which absolutely establishes his identity. This is true also if he drives away from the meter during his allotted parking period without dropping in the meter the required coin. Additionally, if a parker overstays his allotted time and desires to have his key released he must locate a police officer or other person in authority who by the use of a special police key may release the parker's key and serve on the offender a court summons or proceed otherwise against him as the law of the city or town provides.

Fig. 1 is an end elevation of the improved parking meter mounted on a suitable support.

Fig. 2 is a side elevation of the parking meter illustrated in Fig. 1.

Fig. 3 is a plan view of one of the keys issued to operators of motor vehicles and the like.

Fig. 4 is a vertical section taken on line 4—4 of Figs. 2 and 8.

Fig. 5 is a vertical section taken on line 5—5 of Figs. 2 and 8.

Fig. 14 is a vertical section similar to Figs. 9, 12, and 13 but showing parts of the mechanism of the meter in still different positions.

Figures 1, 2, 3, 4, 5, 14:
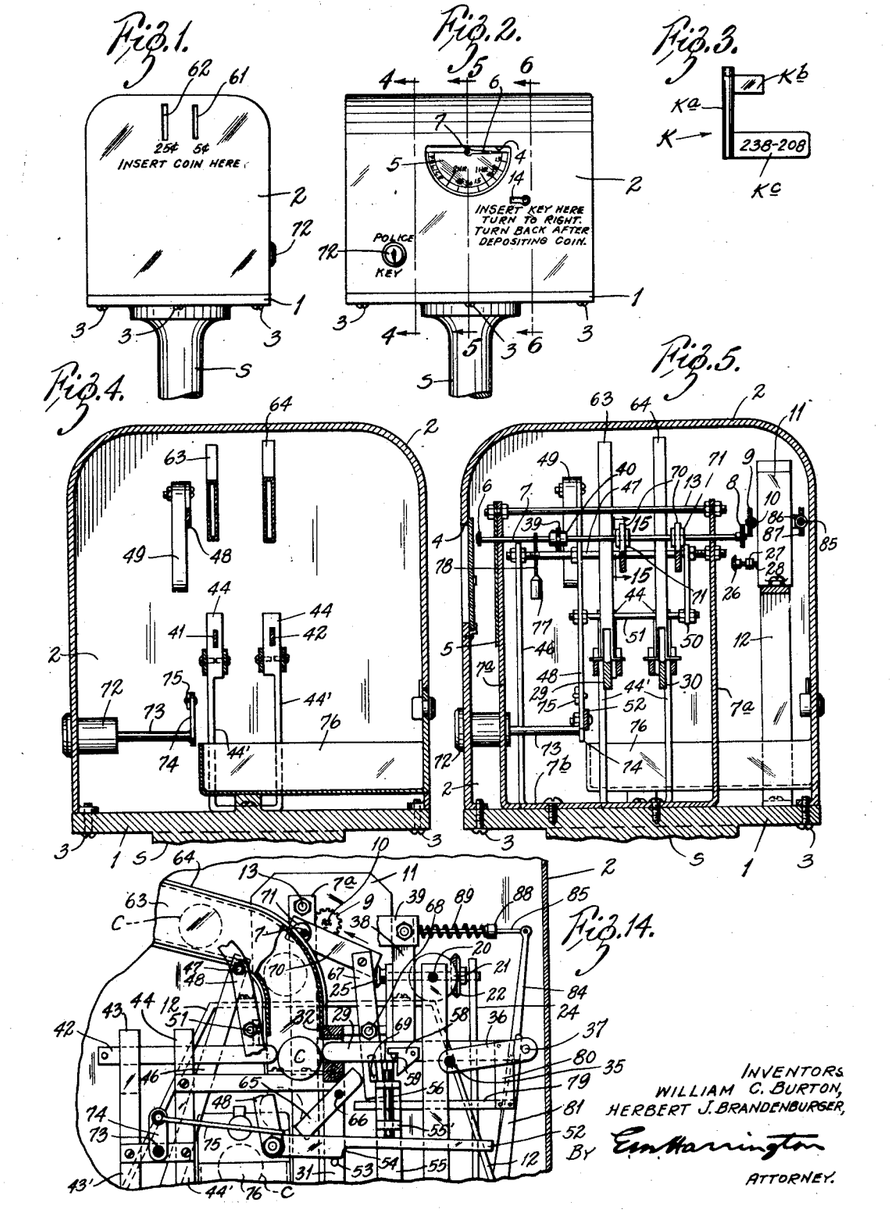
Figure 7:
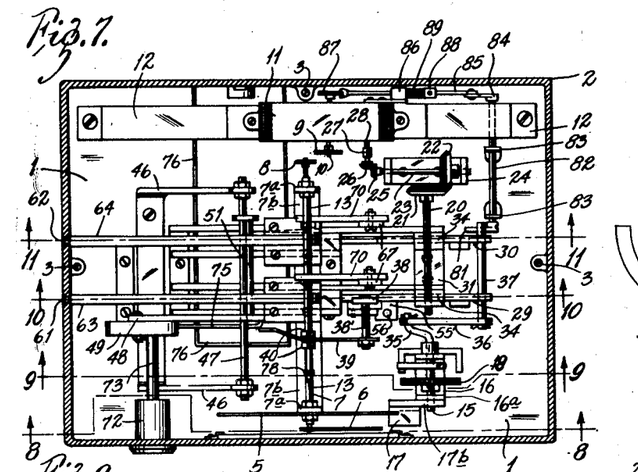
Fig. 7 is a horizontal section taken through the upper portion of the casing of the improved parking meter with the mechanism thereof shown in plan.
Figure 8:
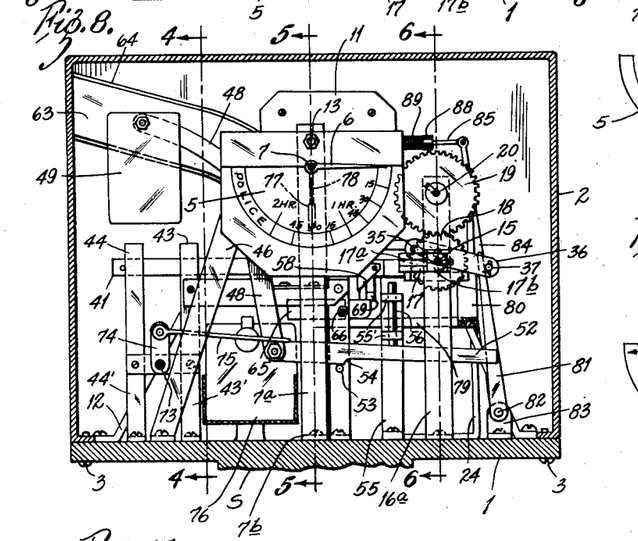
Fig. 8 is a vertical section taken on the staggered line 8—8 of Fig. 7.

In the drawings, wherein is shown for the purpose of illustration, merely, one embodiment of the invention 1 designates the base plate of the improved meter which may be a part of or attached to a suitable support S. The improved meter includes also a suitable casing 2 which may be secured to the base plate by suitable fastening devices 3. The casing 2 is provided with a glass-covered sight opening 4 at which a time dial 5 is displayed (Fig. 2), said dial being provided with graduations which divide said dial into two time periods of one hour each and an overtime period which in Figs. 2 and 8 is identified by the word "police." Arranged for rotation with respect to the dial 5 is a time indicator 6, said time indicator being fixedly mounted on a shaft 7 which extends in the direction of the depth of the casing 2 (Figs. 5 and 7). The shaft 7 is supported for rotation in a horizontal position in bearing openings formed in the upstanding legs 7ª of a U-shaped support 7ᵇ.

The shaft 7 at its rear end has fixed thereto a pinion 8 and, as will presently appear therein, said shaft is shiftable longitudinally of its axis to move said pinion 8 into and out of mesh with a similar pinion 9 which is mounted on the main shaft 10 of a clock 11 having an ordinary stem-wound clock mechanism. The clock 11 is mounted on a suitable support 12 which is attached at its lower end to the base plate 1 of the meter. The upstanding legs 7a of the U-shaped support 7ᵇ are tied together at their upper ends for rigidity by a tie rod 13 as shown to the best advantage in Fig. 5. It is obvious that when the pinion 8 is in mesh with the pinion 9 and the mechanism of the clock 11 is in operation, the shaft 7 will be rotated to move the time indicator 6 in a rotary direction with respect to the graduations on the dial 5 to indicate passage of time during such movement of the time indicator.

Figures 6, 11, 13, 15, 16:
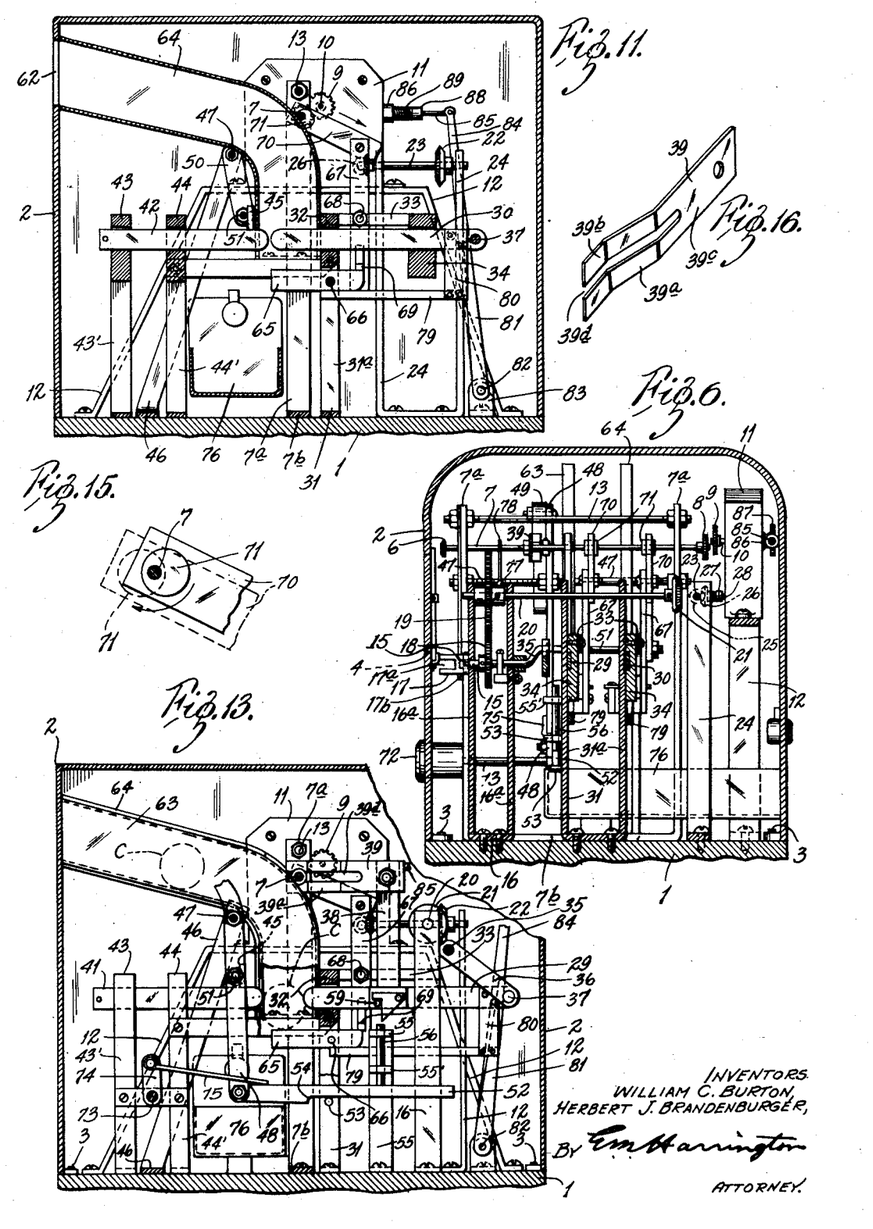
Fig. 6 is a vertical section taken on line 6—6 of Figs. 2 and 8.
Fig. 11 is a vertical section taken on the line 11—11 of Fig. 7.
Fig. 13 is a vertical section similar to Figs. 9 and 12 but showing parts of the mechanism of the meter in still different positions and showing a coin by dotted lines in a position such coin will assume at one stage of the operation of the meter.
Fig. 15 is an enlarged fragmentary sectional elevation taken on line 15—15 of Fig. 5.
Fig. 16 is a perspective of the shifting arm employed to connect certain parts of the mechanism of the meter to the clock mechanism forming a part of the meter.
Figure 17:
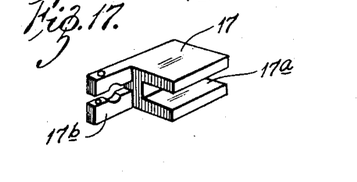
Fig. 17 is a perspective of the key-receiving arm of the meter.
Figure 21:
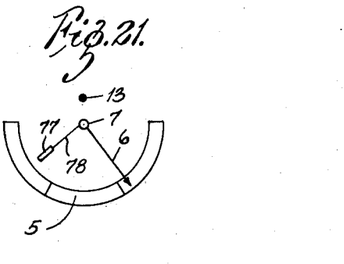
Figs. 21, 22, and 23 are skeleton front elevations illustrating the time indicator of the meter in different positions.
Figure 22:
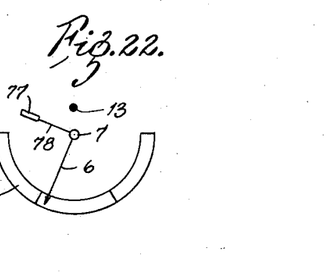

Formed in the casing 2 of the meter is a key hole 14 (Fig. 2) which receives a key, one of which is carried by each vehicle operator who may have occasion to use one of the improved meters. One of the keys mentioned is illustrated in Fig. 3 and said key, which is designated by the reference character K, comprises a shank portion Kª, a wing portion Kᵇ and a handle or finger portion Kᶜ. As shown in Fig. 3 the handle or finger portion Kᶜ of the key K is provided with an identifying mark, for instance, the license number of the motor vehicle of the holder of the key. Arranged within the casing of the meter is a shaft 15 which is supported for rotation by the upstanding legs 16ª of a U-shaped support 16 (Fig. 6). The shaft 15 has fixed thereto at the end of the shaft which is located adjacent to the front wall of the casing of the meter a key-receiving element 17, said key-receiving element being illustrated in Fig. 17. The key-receiving element 17 includes a body portion provided with a slot 17ª and projected from said body portion is a split extension 17ᵇ which is adapted to be brought into clamping engagement with the shaft 15 to secure said key-receiving element to said shaft.

The shaft 15 performs several functions in the operation of the improved meter one of which is that of rewinding the main spring of the clock 11. In order that it may perform this function the shaft 15 has fixedly mounted thereon a pinion 18 which meshes with a pinion 19 (Fig. 6) that is fixedly mounted on a shaft 20. The shaft 20 is supported for rotation in bearing openings formed in the upper portions of the upstanding legs of the U-shaped support 16 and in similar bearing openings formed in other vertically disposed parts of the meter which will be hereinafter described, said shaft 20 having fixedly mounted thereon at its inner end a bevel pinion 21. The bevel pinion 21 meshes with a similar bevel pinion 22 which is fixedly mounted on a shaft 23 (Fig. 7) and this shaft 23 is supported for rotation by a support 24 which is secured to the base plate of the meter and extends upwardly therefrom. The shaft 23 has fixedly mounted thereon a second, smaller bevel pinion 25 which meshes with a bevel pinion 26, said bevel pinion 26 being secured by suitable coupling means 27 to the winding stem 28 cooperatively associated with the main spring of the clock 11.

It is obvious from the foregoing that when the shaft 15 is rotated in a clockwise direction rotary motion will be imparted to the shaft 20 through the pinions 18 and 19. It is plain also that such rotation of the shaft 20 will be transmitted to the shaft 23 through the bevel pinions 21 and 22 and from the shaft 23 to the winding stem 28 of the clock 11 through the bevel pinions 25 and 26 so as to wind the main spring of the clock.

Forming parts of the coin-handling mechanism of the improved meter which will be hereinafter described in detail is a pair of spaced apart, horizontally arranged bars 29 and 30, said bars 29 and 30 being adapted for reciprocatory movement in the direction of the longitudinal dimension of the casing of the meter. The bars 29 and 30 are supported for reciprocatory movement by U-shaped supports 31 which are secured to the base plate of the meter and are provided with spaced, upstanding legs 31ª (Fig. 6), said upstanding legs of the supports 31 being provided with relatively thick portions 32 through which openings are formed in which the bars 29 and 30 are slidingly supported. Additionally the thick portions 32 of the supports 31 have fixed thereto arms 33 which extend from the thick portions 32 and support at their ends remote from said thick portions blocks 34 (Fig. 11). The blocks 34 have formed therein openings which are alined with the openings of the thick portions 32 of the supports 31 and the bars 29 and 30 are supported for reciprocatory movement in these alined openings.

Returning to the shaft 15 previously mentioned herein it will be noted from an inspection of Fig. 7 that this shaft is bent at its inner end to provide a crank 35. It will be noted also from the view mentioned that this crank 35 has attached to it a connecting arm 36 which, at the end thereof opposite to the end connected to the crank 35 is attached to a rod 37 which is fixedly carried by the spaced bars 29 and 30. It is plain because of this arrangement that rotation of the shaft 15 in a clockwise or counterclockwise direction will cause the bars 29 and 30 to be subjected to sliding movement with respect to their supports in one or the opposite direction.

Figure 12:
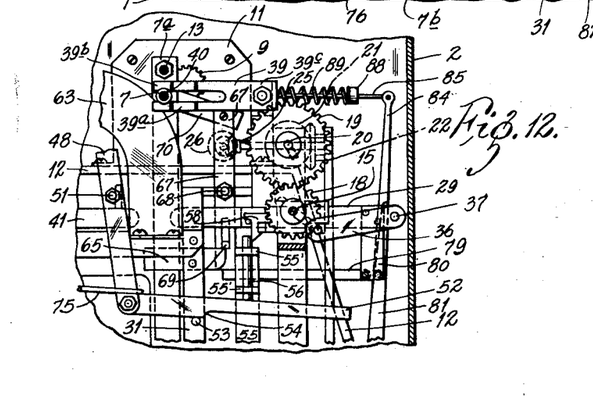
Fig. 12 is a fragmentary vertical section illustrating parts of the mechanism shown in Fig. 9 in changed positions.

Fixed to the bar 29 and extended upwardly therefrom is an arm 38 that moves with said bar 29 when it is subjected to reciprocatory movement. The arm 38 has fixed to it at its upper end by means of a rod 38' a shifting element 39 (Figs. 7, 12, and 13). The shifting element 39 is shown to the best advantage in Fig. 16 which shows that said shifting element is provided with an inclined intermediate cam portion 39$^a$ which causes the free end portion 39$^b$ of the shifting element to be offset horizontally from the main portion 39$^c$ of the shifting element which is attached to the arm 38. It will be noted also that the shifting element 39 is provided with a longitudinally extended slot 39$^d$ which is open at the free end of the shifting element. The portions of the shifting element 39 at opposite sides of the slot 39$^d$ thereof straddle the shaft 7 as shown in Figs. 12 and 13 and portions of the shifting element adjacent to said slot extend between a pair of slightly spaced apart collars 40 (Fig. 7) fixedly mounted on the shaft 7. Because of this arrangement movement of the shifting element 39 to the right from the position in which said shifting element is shown in Fig. 7 will result in the intermediate inclined cam portion 39$^a$ of the shifting element shifting the shaft 7 toward the rear wall of the casing of the meter so as to move the pinion 8 mounted at the inner end of said shaft 7 into mesh with the pinion 9 mounted on the main shaft 10 of the clock 11. In like manner when the pinions 8 and 9 are in mesh movement of the shifting element 39 in the reverse direction to that described will result in the shaft 7 being shifted so as to draw the pinion 8 out of mesh with the pinion 9.

From an understanding of as much of the invention as has been thus far described it is obvious that rotation of the shaft 15 in a clockwise direction with the aid of a key such as that designated by the reference character K will result in simultaneous winding of the clock 11, moving the bars 29 and 30 to the right in Figs. 7, 9, 10, 11, 12, and 13, and because the shifting element 39 moves with the bar 29, shifting the shaft 7 to move the pinion 8 into mesh with the pinion 9 of the clock so that the time indicator 6 will move in response to operation of the clock with respect to the time dial 5.

The coin-handling mechanism of the improved meter includes the bars 29 and 30 heretofore mentioned, and associated with said bars 29 and 30 is a pair of similar bars 41 and 42 which are alined with said bars 29 and 30. Like the bars 29 and 30 the bars 41 and 42 are supported for reciprocatory movement, said bars 41 and 42 being slidingly mounted in openings formed in members 43 and 44 supported at the upper ends of U-shaped supports 43' and 44' which are secured to the base plate of the meter. Each of the bars 41 and 42 is provided with an upstanding abutment element 45.

Figures 9, 10, 18, 19, 20:
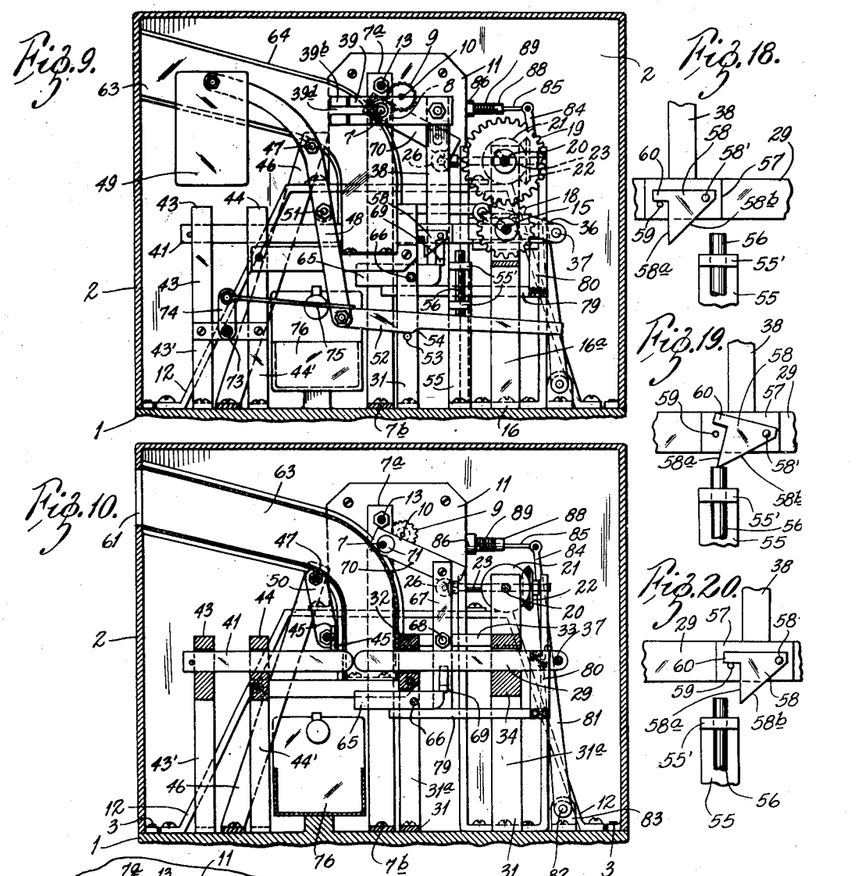
Fig. 9 is a vertical section taken on the line 9—9 of Fig. 7.
Fig. 10 is a vertical section taken on the line 10—10 of Fig. 7.
Figs. 18, 19, and 20 are fragmentary views which illustrate in different positions certain parts of the coin handling mechanism of the meter.

Supported for rotation by a pair of upstanding spaced apart supports 46 is a shaft 47 on which an arm 48 is fixedly mounted, said arm including a straight portion which extends downwardly from the shaft 47 and a curved portion which extends upwardly from said shaft 47. At the outer end of the curved, upwardly extended portion of the arm 48 a weight 49 is attached thereto (Fig. 9) which tends to move the lower end of said arm 48 to the right. Fixed to the shaft 47 in spaced relation with respect to the straight downwardly extended portion of the arm 48 is a shorter arm 50 which is arranged in parallelism with a portion of the straight lower portion of the arm 48, and extended from the arm 48 to the lower portion of the arm 50 is a rod 51 with which the upstanding abutment elements 45 of the bars 41 and 42 contact (Figs. 10 and 11). Pivotally attached to the lower end portion of the arm 48 is an arm 52 which is supported in a substantially horizontal position by a pin 53 that extends from the upstanding support 31 previously mentioned herein. The free end portion of the arm 52 is of less width than the opposite end thereof, and at the point where the wider and narrower portions meet the arm 52 is provided with a curved face 54.

Secured to the base plate of the meter and extended upwardly therefrom is a support 55 which is provided with a pair of vertically spaced bearing extensions 55' which are provided with alined openings in which a vertically disposed locking pin 56 is slidingly arranged, the lower end of the locking pin 56 resting upon the top face of the arm 52 whereby said locking pin is supported by said arm 52. Fixed to the bar 29 is a block 57 to which is pivotally attached at 58' a dog 58 (Figs. 18, 19, and 20). The block 57 has extended therefrom a pin 59 which serves as an abutment for an extension 60 formed on the dog so that downward pivotal movement of the free end of the dog is limited. It is to be noted that the dog 58 is provided with a straight abutment face 58$^a$ and an inclined face 58$^b$.

The casing of the meter is provided with a pair of coin openings 61 and 62 (Fig. 1) and arranged within the casing of the meter is a pair of coin tubes 63 and 64 which lead from said coin slots downwardly to points between the inner adjacent ends of the associated and longitudinally alined pairs of bars 29—41 and 30—42, the bars of each associated pair of bars being extended at their inner adjacent ends through apertures formed through opposed wall portions of the associated coin tube (Fig. 10). Arranged beneath the lower end of each coin tube is a tipable coin support 65, said coin supports being pivoted as indicated at 66 in Fig. 10 to the upright support 31. When measured from the pivot point the portion of each coin support which is disposed beneath the associated coin tube is longer than the portion of the coin support at the opposite side of the pivot point so that in the absence of means to hold the coin support in a horizontal position the longer portion of the coin support which underlies the lower end of the associated coin tube will drop downwardly to the position in which the coin support is shown in Fig. 14.

In order to normally retain the coin supports 65 in their effective horizontal positions each of said coin supports has associated with it a substantially vertical arm 67 which is pivoted at 68 to a horizontal support 33 previously mentioned herein. Each arm 67 is provided with a laterally projected extension 69 which normally overlies and contacts with the top face of the associated coin support at a point adjacent to the outer end of the shorter portion of the coin support measured from the pivot point of the coin support. Each arm 67 has pivoted to its upper end a connecting arm 70, which at its opposite end has formed therein an opening in which an eccentric 71 fixedly mounted on the shaft 7 operates. It is obvious that when the clock 11 is in operation and the shaft 7 is being rotated, a rotary movement of the eccentrics 71 will subject the arms 70 to longitudinal movement. It is likewise plain that if such longitudinal movement of the arms 70 continues in the direction indicated by the arrow in Fig. 14 to a sufficient extent the extensions 69 on the arms 67 will be moved out of contact with the top faces of the coin supports 65 so as to permit said coin supports to move about their pivots to the position in which the coin support is shown in Fig. 14.

As will presently appear herein, the lower end of the arm 48 and the associated arm 52 under certain circumstances are moved to the left in Fig. 9 by rotation of the key K within the casing of the meter. Under other circumstances it may be necessary to subject said arms 48 and 52 to such movement by means of special police keys which will be in the possession of police officers or other persons in authority. The meter is therefore provided with a lock mechanism 72 (Figs. 2, 4, 6, and 7) of suitable construction and arrangement which includes a rotatable shaft 73 provided at its inner end with an arm 74. The arm 74 has pivotally attached thereto a link 75 (Fig. 9) which at the end thereof opposite to the end attached to the arm 74 engages the lower end portion of the arm 48. When it is desired to move the lower end of the arm 48 and the arm 52 to the left in Fig. 9 by means other than a parker's key K one of the special police keys is introduced into the key hole of the lock mechanism 72. The key is then rotated counter clockwise to rotate the shaft 73 and the arm 74 and thereby cause the link 75 to subject the arms 48 and 52 to the desired movement.

In the operation of the improved parking meter a person who wishes to park his motor vehicle at the parking meter introduces his parking key K in the key hole 14 which results in the wing portion K$^b$ of the key being extended into the slot 17$^a$ of the key-receiving element 17 that is fixed to the shaft 15 (Fig. 7). The parker then rotates the key in a clockwise direction and, as has been already explained herein, such rotation of the key rotates the shaft 15 and simultaneously moves the bars 29 and 30 to the right in Figs. 7, 8, 9, 10, 11, 12, 13, and 14, winds the main spring of the clock 11, and moves the pinion 9 into mesh with the pinion 9 of the clock so that the time indicator 6 moves with respect to the time dial 5 to indicate the passage of the time the parker's vehicle occupies the parking space. Before the parker's key was turned as described the bars 29 and 30 were so positioned that the dog 58 supported by the bar 29 occupied the position with respect to the locking pin 56 illustrated in Fig. 18. Also as the bar 29 was moved to the right in Fig. 18 by rotation of the parker's key the inclined face of the dog 58 contacted with the top of the locking pin with the result that the dog was cammed upwardly as shown in Fig. 19 and after the dog had passed the upper end of the locking pin said dog dropped down to the position in which it is shown in Fig. 20. With the bars 29 and 30 moved to the right as described above it is obvious that the parker may not remove his key from the meter (unless he deposits a proper coin in the meter as will presently be explained) because if he attempts to rotate his key back to the position where the wing K$^b$ of the key registers with the keyhole 14 the straight abutment face 58$^a$ of the dog will contact with the locking pin to prevent further rotation of the shaft 15 and the parker's key K.

It is plain, therefore, that once a parker introduces his key into the key hole 14 of the meter and rotates the key in a clockwise direction to its full extent the key is locked in the meter and may be removed only by depositing a proper coin in the meter as will presently appear herein.

Assume now that a parker may occupy parking space for one hour on payment of five cents and that a parker returns for his motor vehicle before the one hour period has expired. He deposits a five cent piece in the coin slot 61 and the coin is conducted by the coin tube to a point between the adjacent inner ends of the associated bars 29 and 41 where said coin rests edgewise on the associated coin support 65 as shown in Fig. 13 wherein the coin is designated by the reference sharacter C. The parker then rotates his key, which has been and is still locked in the meter, in a counter clockwise direction. This moves the bars 29 and 30 to the left in Fig. 13 and the movement of the bar 29 is transmitted through the coin C to the bar 41 and upon such movement of the bar 41 the abutment element 45 thereof moves the rod 51 associated with the arms 48 and 50 to the left in Fig. 11 which results in the lower end of the arm 48 and the arm 52 being likewise moved to the left:

Before the arm 52 starts its movement to the left as described above it is supported by the pin 53 as shown in Fig. 12 and immediately after such movement to the left is initiated the wider portion of said arm terminates and the free end portion of the arm moves downwardly where the lower face of the narrower portion of the arm contacts with the pin 53 as shown in Fig. 13. Such lowering of the arm 52 is accompanied by corresponding lowering of the locking pin 56 and because the lowering of the locking pin occurs just before the abutment face 58$^a$ of the dog 58 reaches the position of the locking pin said dog may move past the lowered locking pin without interference therefrom as also shown in Fig. 13. The longitudinal movement of the bars 29 and 41 with the coin therebetween continues until the end of the coin support 65 is reached when the pinching pressure exerted by the bars 29 and 41 against the edge of the coin at opposed points above the center of the coin forces the now unsupported coin downwardly into a coin receptacle 76. At this time the parker's key is properly alined with the key hole 14 for removal therefrom and it may be withdrawn.

When the coin is discharged from between the adjacent ends of the arms 29 and 41 as described, the weight 49 returns the arms 48 and 50 to their normal positions, the rod 51 returning the bar 41 to its normal position through contact thereof with the upstanding abutment 45 of said rod 41. Also when the lower end of the arm 48 moves to the right, during restoration of said arm 48 to its normal position, the curved face 54 of the arm 52 rides up on the pin 53 to elevate the rear end portion of said arm 52 to thereby elevate the locking pin 56.

Assume now that instead of returning to the meter within an hour the parker returns in an hour and a half. He has now passed the period for which he may park for five cents and is in the second hour, or the twenty-five cent period. From the moment the parker turned his key to set the meter in operation the eccentric 71 fixed to the shaft 7 and cooperatively associated with the bars 29 and 41 has been rotatting with the shaft and said rotating eccentric has been steadily drawing the associated arm 70 in the direction of the arrow in Fig. 14. The mechanism of the meter is so timed that at the moment the first parking hour terminates the arm 70 associated with the unit of which the bars 29 and 41 form parts reaches the limit of its upwardly inclined movement and when that limit of movement is reached said arm 70 will have moved the lower end of the associated arm 67 to a position as shown in Fig. 14 where the extension 69 thereof clears the top face of the associated coin support 65. This permits the coin support to move to the position in which it is shown in Fig. 14. Therefore, if the parker returns after the first parking hour has elapsed and attempts to operate the meter with a five cent piece the coin will pass through the meter and will fall in the coin box without affecting the meter mechanism, this because the displaced coin support provides no support for the coin between the bars 29 and 41.

To obtain the release of his key therefore the parker who overstayed the first parking hour but is within the second parking hour must insert a twenty-five cent piece in the coin slot 62. The coin so inserted will be supported by the associated coin support 65 between the adjacent ends of the bars 30 and 42, as the eccentric 71 which controls release of said coin support is so shaped and arranged that it releases the coin support only after two hours of parking time has elapsed. He may then rotate the key in a counter clockwise direction to move the bars 29 and 30 to the left as already explained and movement of the bar 30 will be transmitted through the interposed twenty-five cent piece to the bar 42 whereby the abutment element 45 of said bar 42 will move against the rod 51 to move the lower end of the arm 48 and the arm 52 to the left as already explained. This will permit the locking pin to move downwardly so as to allow the dog 58 to pass over it whereby certain parts of the mechanism of the meter may be moved to positions where the parker's key may be removed from the meter as has been previously explained herein.

Upon completion of the second parking hour the coin support 65 associated with the unit of the machine which is operated by a twenty-five cent piece is released and drops to its lowered position because of operation of the associated eccentric 71 on the shaft 7. If a parker inserts a twenty-five cent piece in the meter after such expiration of the second one hour parking period has expired the coin will merely pass through the meter to the coin receptacle 76 without affecting the mechanism of the meter. Therefore, the only way the parker may obtain the release of his key after the second parking period has expired is to locate a police officer or other person in authority who possesses one of the special police keys. This person will move the arm 52 to the left with the aid of his special key thereby permitting the locking pin 56 to drop down out of the path of travel of the dog 58. The parker's key may then be released and the parker will be served with a court summons or otherwise proceeded against by the person in authority who released his key.

It is obvious from the foregoing that the predominant feature of the invention is that a parker who overstays the allotted parking time and drives away, or who drives away without depositing the required coin in the meter leaves behind him a key which positively identifies him and which is locked against removal by him or any other person. The proper authorities, therefore, may have a complete check on users of the meters without the necessity of following the expensive procedure of providing extra police officers to oversee the use of the meters.

Figure 23:
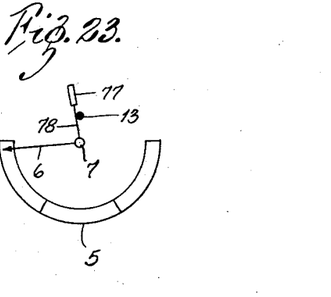

It is to be noted that the shaft 7 on which the time indicator 6 is mounted has suspended therefrom a weight 77 which moves in an arc of a circle when the shaft is rotated by the clock 11. This weight serves to return the time indicator to the zero position when the pinion 8 is disengaged from the pinion 9 as the weight always moves less than 180° from the position in which it is shown in Fig. 8 and therefore it will swing downwardly to its vertically suspended position shown in Fig. 8 each time the pinion 8 is disengaged from the pinion 9. Also when the time indicator 6 reaches the limit of the police period on the dial 5 the supporting rod 78 of the weight 77 will contact with the tie rod 13, as shown in Fig. 23, to stop operation of the clock 11.

When the coin supports 65 have dropped down to the position in which the coin support is shown in Fig. 14, said coin supports are restored to their horizontal positions the next time the shaft 15 is rotated in a counterclockwise direction to move the bars 29 and 30 toward the left in Fig. 14. Such restoration of the coin support to their horizontal positions is performed by horizontal arms 79 which are secured by elements 80 to the bars 29 and 30 and move therewith, said arms 79 moving against the under faces of the coin supports so as to cam the lowered portions thereof upwardly. The restoration of the coin supports to their horizontal positions as described occurs slightly before the arms 67 are returned to their normal positions in response to rotation of the eccentrics 71 as the shaft 7 is rotated by the weight 77 to bring the time indicator 6 to the zero position. Therefore when the arms 67 are returned to their normal positions the extensions 69 thereof contact with the top faces of the coin supports to retain said coin supports in their horizontal positions.

When, in the operation of the meter a parker turns his key counterclockwise to move the bars 29 and 30 to the left and to withdraw the key from its key hole, an end portion of the rod 37 which is carried by said bars strikes an upstanding arm 81 which is secured to a shaft 82 supported for rotary motion by suitable bearing elements 83 fixed to the base plate of the meter. At its rear end the shaft 82 has fixed to it an upstanding arm 84 which at its upper end is loosely pivoted to a horizontal member 85 which is supported for sliding movement in a bearing member 86 extended from the housing of the clock 11. The free end of the horizontal member is adapted to be moved between teeth of a pinion 87 mounted on the main shaft of the clock for the purpose of stopping operation of the mechanism of the clock. Also the horizontal member has fixedly mounted thereon a collar 88 and an expansible coil spring 89 is interposed between the collar and the bearing 86 which tends to move the free end of the horizontal member out of engagement with the teeth of the pinion 87.

As the bars 29 and 30 approach the limit of their movement to the left in the operation of the meter the end portion of the rod 37 strikes the arm 81. This rotates the shaft 82 and moves the upper end of the upstanding arm 84 toward the clock 11 thereby forcing the free end of the horizontal member 85 between teeth of the pinion 87 to stop operation of the clock. When, on the other hand the shaft 15 is rotated in a clockwise direction to set the mechanism of the meter in motion the extended end portion of the rod 37 associated with the bars 29 and 30 is moved out of contact with the upstanding arm 81 and this permits the coil spring 89 to withdraw the free end of the horizontal member 85 from between teeth of the pinion 87 so that the clock may operate.

We claim:

1. A parking meter for vehicles comprising a casing, a mechanism disposed within said casing and operable to indicate passage of time, a wall of said casing being provided with an opening, actuating mechanism arranged for cooperation with said time-indicating mechanism and adapted for operation by an operating element inserted into said opening to set said time-indicating mechanism in operation, means within said casing for locking said operating element in said opening against removal therefrom, said means comprising locking mechanism adapted to lock said actuating mechanism against such actuation by said operating element as will permit withdrawal of said operating element from said opening, and coin-controlled means which cooperates with said locking mechanism and is adapted to render same ineffective and thereby release said actuating mechanism for such actuation by the operating element as will permit removal of said operating element from said opening.

2. A parking meter for vehicles comprising a casing, a mechanism disposed within said casing and operable to indicate passage of time, a wall of said casing being provided with an opening, actuating mechanism arranged for cooperation with said time-indicating mechanism and adapted for operation by an operating element inserted into said opening to set said time-indicating mechanism in operation, means within said casing for locking said operating element in said opening against removal therefrom, said means comprising locking mechanism adapted to lock said actuating mechanism against such actuation by said operating element as will permit withdrawal of said operating element from said opening, coin-controlled means which cooperates with said locking mechanism and is adapted to render same ineffective and thereby release said actuating mechanism for such actuation by the operating element as will permit removal of said operating element from said opening, and means cooperating with said time-indicating mechanism and with said coin-controlled mechanism for rendering said coin-controlled means inoperative after passage of a predetermined period of time as indicated by said time-indicating mechanism.

3. A parking meter for vehicles comprising a casing, a mechanism disposed within said casing and operable to indicate passage of time, a wall of said casing being provided with an opening, actuating mechanism arranged for cooperation with said time-indicating mechanism and adapted for operation by an operating element inserted into said opening to set said time-indicating mechanism in operation, means within said casing for locking said operating element in said opening against removal therefrom, said means comprising locking mechanism adapted to lock said actuating mechanism against such actuation by said operating element as will permit withdrawal of said operating element from said opening, coin-controlled means which cooperates with said locking mechanism and is adapted to render same ineffective and thereby release said actuating mechanism for such actuation by the operating element as will permit removal of said operating element from said opening, and means cooperating with said time-indicating mechanism and with said coin-controlled mechanism for rendering said coin-controlled means inoperative after passage of a predetermined period of time as indicated by said time-indicating mechanism, said locking mechanism being so constructed and arranged as to be adapted for actuation independently of said coin-controlled means to release said actuating mechanism from a locked condition for such actuation as will permit removal of said operating element from said opening.

4. A parking meter for vehicles comprising a casing, a mechanism disposed within said casing and operable to indicate passage of time, said time-indicating mechanism including a part on which time markings appear, a window formed in a wall of said casing at the location of said part of the time-indicating mechanism through which time markings on said part may be viewed, a wall of said casing being provided with an opening, actuating mechanism arranged for cooperation with said time-indicating mechanism and adapted for operation by an operating element inserted into said opening to set said time-indicating mechanism in operation, means within said casing for locking said operating element in said opening against removal therefrom, said means comprising locking mechanism adapted to lock said actuating mechanism against such actuation by said operating element as will permit withdrawal of said operating element from said opening, and coin-controlled means which cooperates with said locking mechanism and is adapted to render same ineffective and thereby release said actuating mechanism for such actuation by the operating element as will permit removal of said operating element from said opening.

5. A parking meter for vehicles comprising a casing, a mechanism disposed within said casing and operable to indicate passage of time, a wall of said casing being provided with an opening, actuating mechanism arranged for cooperation with said time-indicating mechanism and adapted for operation by rotation of an operating element inserted into said opening to set said time-indicating mechanism in operation, means within said casing for locking said operating element in said opening against removal therefrom, said means comprising locking mechanism adapted to lock said actuating mechanism against such actuation by said operating element as will permit withdrawal of said operating element from said opening, and coin-controlled means which cooperates with said locking mechanism and is adapted to render same ineffective and thereby release said actuating mechanism for such actuation by the operating element as will permit removal of said operating element from said opening.

WILLIAM C. BURTON.
HERBERT J. BRANDENBURGER.